United States Patent [19]
Ishii et al.

[11] Patent Number: 5,959,855
[45] Date of Patent: Sep. 28, 1999

[54] VOLTAGE CONTROL WITH FEEDBACK UTILIZING ANALOG AND DIGITAL CONTROL SIGNALS

[75] Inventors: Shinichi Ishii, Saitama; Takashi Aihara; Hiroshi Takahashi, both of Tokyo, all of Japan

[73] Assignee: Fuji Electric Co., Ltd., Kawasaki, Japan

[21] Appl. No.: 08/804,876

[22] Filed: Feb. 24, 1997

[30] Foreign Application Priority Data

Feb. 28, 1996 [JP] Japan ................................. 8-040850

[51] Int. Cl.⁶ ........................................................ H02M 3/24
[52] U.S. Cl. .............................. 363/95; 363/41; 318/811
[58] Field of Search ..................................... 323/283, 285, 323/266; 318/811; 363/95, 41

[56] References Cited

U.S. PATENT DOCUMENTS

| | | | |
|---|---|---|---|
| 4,042,868 | 8/1977 | Rhodes | 318/615 |
| 4,109,194 | 8/1978 | Miller | 323/283 |
| 4,450,518 | 5/1984 | Klee | 364/183 |
| 4,584,566 | 4/1986 | Arcara | 341/128 |
| 5,270,633 | 12/1993 | Dijkmans | 318/810 |
| 5,497,062 | 3/1996 | Fenstermacher et al. | 318/599 |
| 5,589,749 | 12/1996 | Davidson et al. | 318/564 |
| 5,633,788 | 5/1997 | Tanaka | 363/41 |

FOREIGN PATENT DOCUMENTS

| | | |
|---|---|---|
| 3340150C2 | 5/1984 | Germany . |
| 3313949A1 | 10/1984 | Germany . |
| 6194585 | 5/1986 | Japan . |
| 62-76930 | 4/1987 | Japan . |
| 63-234878 | 9/1988 | Japan . |

OTHER PUBLICATIONS

Teodorescu, Dan: Die Motorsteuerung von Aufzugsanlagen; In: DE Der Elektromeister, May 1993; H.5, pp. 315–318, (no translation).

Tietze, U. Schenk: Halbleiter–Schaltungstechnik, 4.erw.Aufl., 1978, Springer–Verlag, Berlin, u.a., pp. 641–642, (no translation).

*Primary Examiner*—Shawn Riley
*Attorney, Agent, or Firm*—Greer, Burns & Crain Ltd.

[57] ABSTRACT

An output voltage control apparatus for performing feedback control on an output voltage of an inverter which drives an AC machine. The output voltage control apparatus converts a command value for the output voltage of the inverter into a pulse density using a converter (PDM), and converts a detection value of the output voltage of the inverter into a pulse density using a Δ-Σ modulation converter. The proportional control ability and integral control ability for the output voltage are realized by digital hardware including an up-counter, a down-counter and a shift circuit.

9 Claims, 4 Drawing Sheets

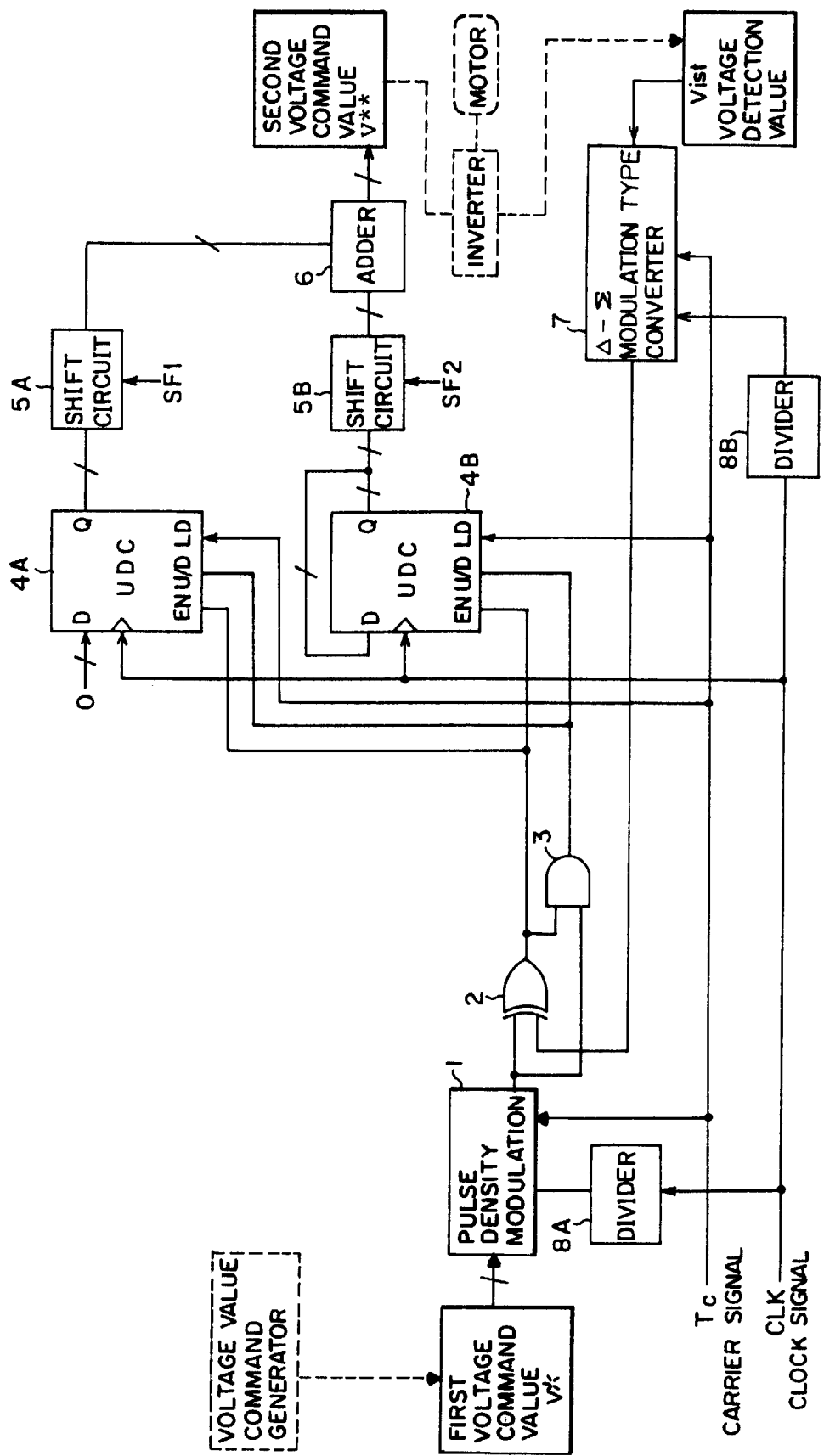
F I G. 2

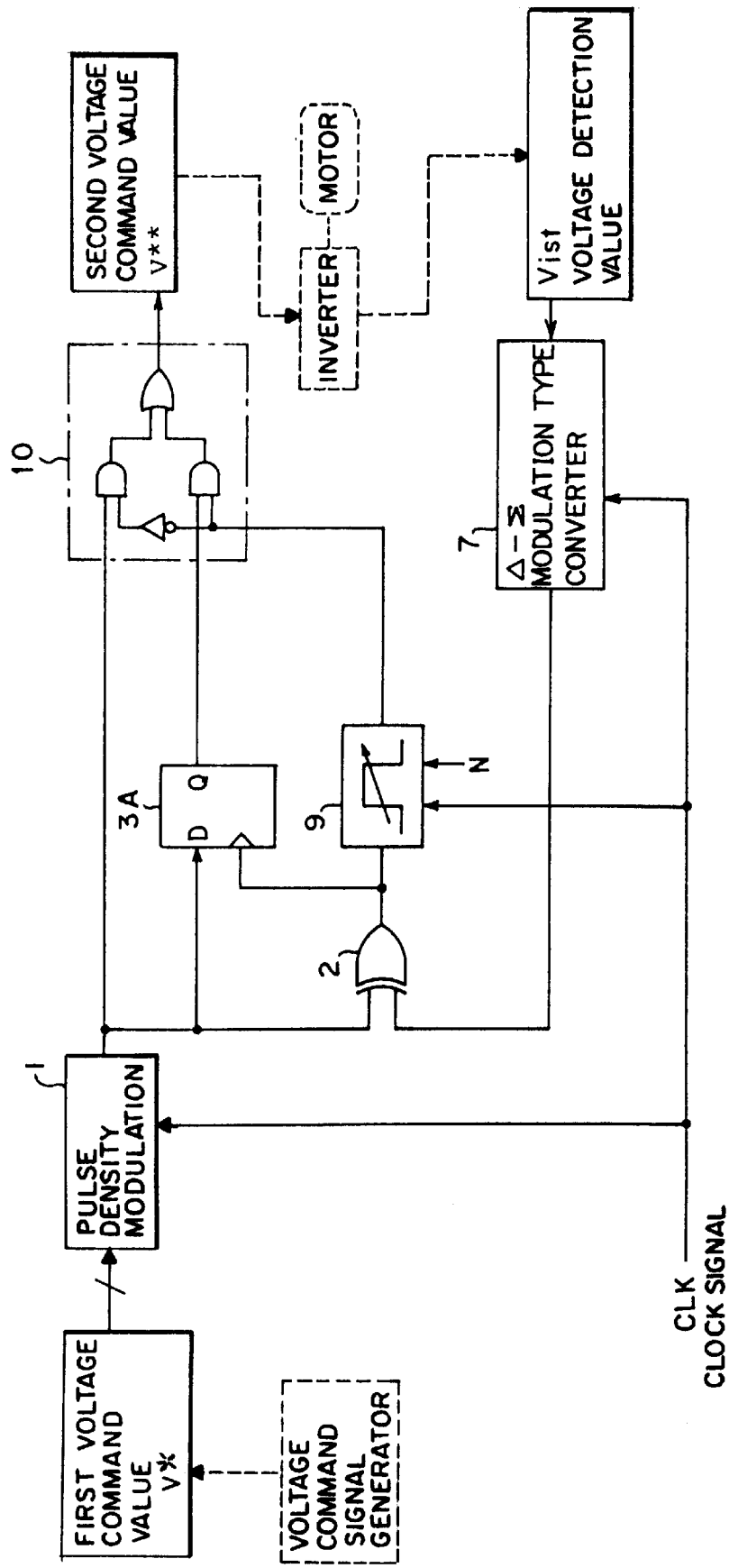
F I G. 3

VOLTAGE CONTROL WITH FEEDBACK UTILIZING ANALOG AND DIGITAL CONTROL SIGNALS

BACKGROUND OF THE INVENTION

1. Field of the Invention

The present invention relates to an output voltage control apparatus for performing feedback control for the drive of, for example, an AC(alternating-current) machine, an induction motor, etc. through an electric power converting device including a voltage PWM (pulse width modulation) inverter.

2. Description of the Related Art

The conventional voltage PWM inverter detects an output voltage, computes a deviation of the detected output voltage value from a voltage command value, and compensates (controls) the deviation using a proportional and integral (PI) controller, etc. The conventional compensating method is disclosed by, for example, Japanese Laid-open Patent Publications (Tokukaisho) No.61-94585 and No.63-234878.

This compensation method applies to both analog system and digital system. The analog system uses a linear IC (operational amplifier), etc., and the digital system uses a central processing unit (CPU) and a digital signal processor (DSP) capable of performing high-speed operations, and a high-resolution and quick-response A/D converter, etc. capable of converting the output of an output voltage detector into digital data so that control is performed in a software operation process.

However, since the analog system requires a linear IC, etc. for each process, the control apparatus becomes costly, and the control becomes complicated. On the other hand, the digital system requires expensive components such as a CPU, a DSP, etc.

SUMMARY OF THE INVENTION

The present invention aims at reducing the cost of the above described control apparatus. It also aims at realizing at a low cost a control apparatus which does not require complicated control operations.

An output voltage control apparatus according to the present invention performs feedback control on a control object, and includes a first conversion unit for converting an output voltage command value for the control object into digital data; a second conversion unit for converting an output voltage detection value of the control object into digital data; a detection unit for detecting the difference in digital output values between the first and second conversion units; and a control unit for outputting the digital data of the control voltage corresponding to the detected difference in digital output values.

Another output voltage control apparatus according to the present invention includes a pulse density modulation type converter (a first conversion unit) for converting an output voltage command value for the control object into a pulse density; a Δ-Σ modulation type converter (a second conversion unit) for converting an output voltage detection value of the control object into a pulse density; a non-matching detection unit for detecting non-matching between the outputs of the pulse density modulation type converter and the Δ-Σ modulation type converter; a polarity detection unit for detecting a polarity of non-matching between the outputs from the pulse density modulation type converter and the Δ-Σ modulation type converter; a first counter unit for counting up or down clock signals depending on the output from the non-matching detection unit and on the polarity detected by the polarity detection unit; a second counter unit for counting up or down clock signals depending on the output from the non-matching detection unit and on the polarity detected by the polarity detection unit, and for setting the resultant count value as the initial value of the next count; first and second operation units for multiplying the output values of the first and second counter units by respective predetermined coefficients; and an adding unit for adding the outputs from the first and second operation units.

Another output voltage control apparatus according to the present invention includes a pulse density modulation type converter (a first conversion unit) for converting an output voltage command value for the control object into a pulse density; a Δ-Σ modulation type converter (a second conversion unit) for converting an output voltage detection value of the control object into a pulse density; a non-matching detection unit for detecting non-matching between the outputs of the pulse density modulation type converter and the Δ-Σ modulation type converter; a time signal generation unit for outputting a predetermined time signal based on an output from the non-matching detection unit; a voltage command generation unit for outputting a voltage command signal based on the output from the pulse density modulation type converter and the output from the non-matching detection unit; and a selection unit for selecting and outputting one of the output from the pulse density modulation type converter and the output from the voltage command generation unit based on the output from the time signal generating unit.

Another output voltage control apparatus according to the present invention performs feedback control of the output voltage of an inverter which drives an AC machine, and includes a first conversion unit for converting the command value for the output voltage of the inverter into a pulse density; a second conversion unit for converting the detection value of the output voltage of the inverter into a pulse density; and a control unit (corresponding to all or a part of 4A, 4B, 5A, 5B, and 6 shown in FIGS. 1 and 2, or 3A and 10 shown in FIGS. 3 and 4) for detecting a deviation in outputs between the first and second conversion units, and for generating a control voltage to control the inverter based on the detected deviation.

The output voltage control apparatus can further comprise a resolution altering unit for altering the resolution of at least one of the first and second conversion units.

The output voltage control apparatus can further comprise a polarity detection unit for detecting a polarity of non-matching between the converted command value and the converted detection value and outputting a polarity signal. The control unit provides the deviation as digital data based on the polarity signal, and generates the control voltage based on the obtained deviation.

The output voltage control apparatus can further comprise a signal generation unit for outputting a selection signal according to the time length of non-matching between the converted command value and the converted detection value. The control unit can comprise a command value generation unit for generating a voltage command value for the inverter based on the non-matching state between the converted command value and the converted detection value; and a selection unit for selecting the output of one of the first conversion unit and the command value generating unit based on the selection signal and for outputting the selected output as the control voltage.

A method of controlling an output voltage according to the present invention is to perform feedback control of the output voltage of an inverter which drives an AC machine, and includes the steps of converting the command value for the output voltage of the inverter into a pulse density; converting the detection value of the output voltage of the inverter into a pulse density; detecting a deviation of the converted command value from the converted detection value, and generating a control voltage for use in controlling the inverter based on the detected deviation.

This output voltage control method can further comprise the step of altering the resolution of the conversion to a pulse density of at least one of the command value and detection value.

This output voltage control method can further comprise the steps of detecting a polarity of a difference between the converted command value and the converted detection values; providing the deviation as digital data based on the detected polarity; and generating a control voltage based on the obtained deviation.

This output voltage control method can further comprise the steps of generating a selection signal according to a time period of non-matching state between the converted command value and the converted detection value; generating a voltage command value for the inverter based on the non-matching state; and selecting one of the command value converted into a pulse density and the voltage command value according to the selection signal, and then outputting the selected value as the control voltage.

According to the present invention, a voltage command value is converted into a pulse density (digital data), and an output voltage detection value is also converted into a pulse density (digital data) using a Δ-Σ modulation converter, and an output voltage detection value is also converted into a pulse density (digital data) using, for example, a Δ-Σ modulation converter. Therefore, a controller can be designed as digital hardware. It is a combination of an analog system and a digital system, and can be realized as a low-cost device.

BRIEF DESCRIPTION OF THE DRAWINGS

FIG. 2 shows the configuration of a variation of the first embodiment of the present invention;

FIG. 3 shows the configuration according to the second embodiment of the output voltage control apparatus according to the present invention.

DESCRIPTION OF THE PREFERRED EMBODIMENT

Figure 1:
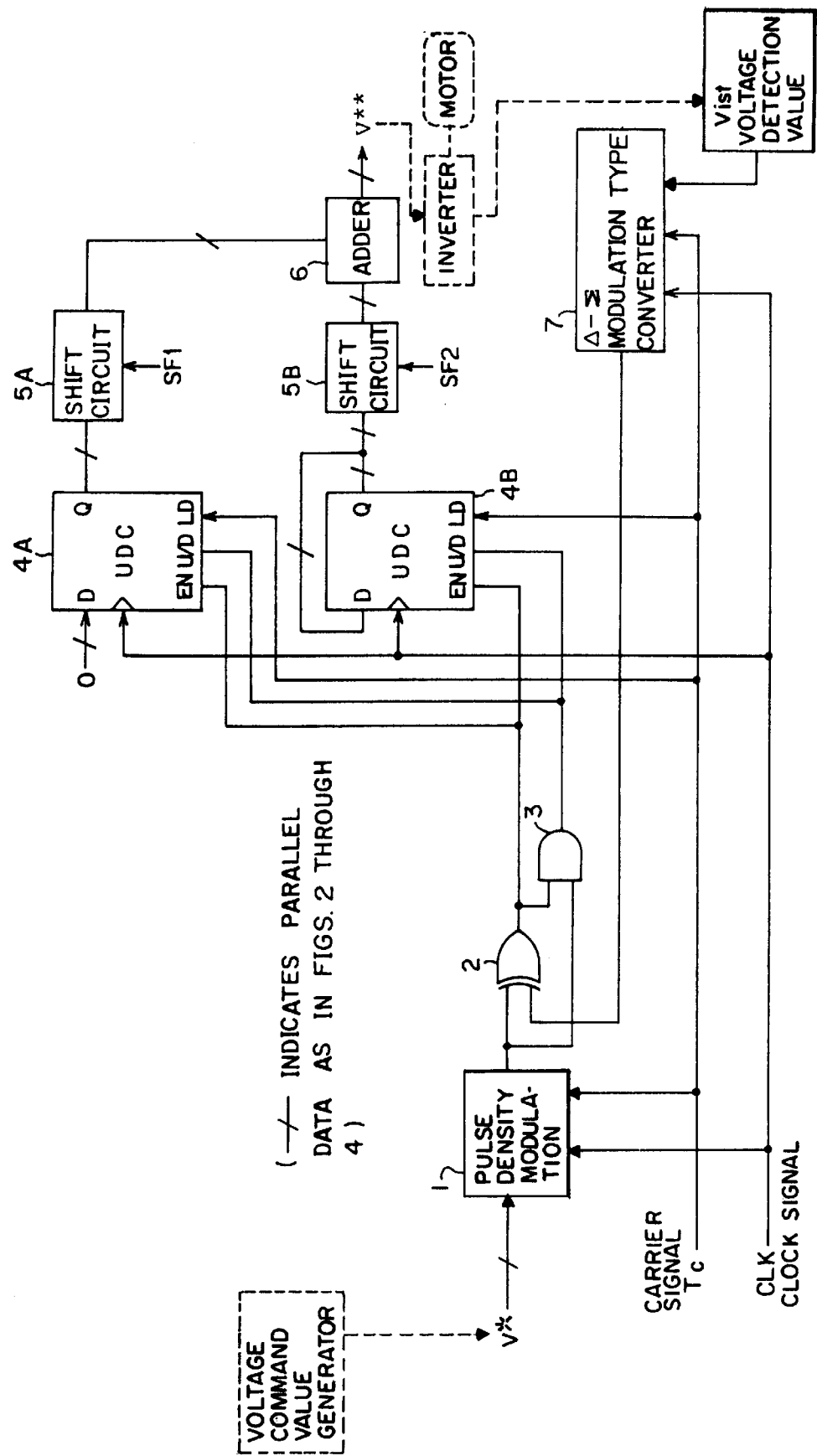
FIG. 1 shows the configuration according to the first embodiment of the output voltage control apparatus according to the present invention.

FIG. 1 shows the configuration according to the first embodiment of the output voltage control apparatus according to the present invention.

As shown in FIG. 1, the output voltage control apparatus comprises a pulse density modulation type converter (PDM) 1; a non-matching detection circuit (exclusive OR circuit: EOR circuit) 2; an AND circuit (polarity detection circuit) 3; up and down counters (UDC) 4A and 4B; shift (multiplication) circuits 5A and 5B; an adder 6; and a Δ-Σ modulation type converter 7. In FIG. 1, V* indicates a first voltage command value input to the control apparatus; V** indicates a second voltage command value output from the control apparatus toward an inverter, etc.; CLK indicates a clock signal; Tc indicates a carrier signal; Vist indicates a voltage detection value. The Δ-Σ modulation type converter 7 can be a commercially available sequential serial comparison type A/D converter, etc. The voltage detection value Vist is a detection value of the voltage output by the PWM inverter, etc. to drive an AC motor.

The voltage command value V* is input to the PDM 1 and converted into a pulse density. The voltage detection value Vist is input to the Δ-Σ modulation type converter 7 and is also converted into a pulse density. The non-matching detection circuit 2 obtains the deviation (or difference) between the output of the PDM 1 and the output from the Δ-Σ modulation type converter 7. The deviation and the output from the PDM 1 are input to the AND circuit 3. Since the AND circuit 3 outputs signals having a different polarity depending on the levels of the two input signals, it is determined whether or not the voltage command value is larger than the detection value (non-matching polarity detecting function).

Next, the output from the AND circuit 3, the output from the non-matching detection circuit 2, and the carrier signal Tc are input to the UDCs 4A and 4B, and the deviation is obtained as digital data. The signal obtained by the UDC 4A functions as a proportional element for output control. Since the UDC 4B feeds its output back to its input terminal, the obtained signal functions as an integral element for output control (integral control function). If only a proportional element or an integral element is required, only the one corresponding UDC is required.

The output of the UDCs 4A and 4B are respectively input to the shift circuits 5A and 5B, respectively assigned the amounts of shift signals (shifting amounts) SF1 and SF2. Therefore, a shifting operation such as a multiplication by $2^n$ is performed depending the amount of the shift signal. Furthermore, the result of the shift operations are added by the adder 6 and provided to, for example, a pulse width modulation (PWM) circuit (not shown in FIG. 1) as a voltage command value (second voltage command value) to generate a gate signal for a switching element of an electric power converter including an inverter. According to the gate signal, the AC motor is controlled to perform a predetermined operation based on the voltage command value.

FIG. 2 shows a variation of the first embodiment.

This variation is obtained by adding, as shown in FIG. 2, dividers (frequency dividers) 8A and 8B for dividing the clock signal CLK of the first embodiment shown in FIG. 1. The detailed description of operation is omitted here because the other units are the same as those described with respect to FIG. 1. Since using the dividers 8A and 8B avoids the necessity for quick-response circuits for the PDM 1 and Δ-Σ modulation type converter 7, a lower cost control apparatus can be successfully realized. Although two dividers 8A and 8B are provided in this example, just one divider can be used for either one of the PDM 1 and the Δ-Σ modulation type converter 7.

FIG. 3 shows the configuration of the output voltage control apparatus according to the second embodiment of the present invention.

As shown in FIG. 3, the output voltage control apparatus according to the second embodiment comprises the PDM 1; the non-matching detection circuit 2; a hold (flipflop, or latch) circuit 3A; the Δ-Σ modulation type converter 7; a mono-stable circuit 9; and a data selection circuit 10. Since the functions of the PDM 1, non-matching detection circuit 2, and Δ-Σ modulation type converter 7 are the same as those according to the first embodiment, the descriptions are omitted here. The signals V*, V**, CLK, and Vist are the same as those shown in FIG. 1.

The voltage command value V* is input to the PDM 1 and converted into a pulse density. The voltage detection value Vist is input to the Δ-Σ modulation type converter 7 and converted into a pulse density thereby. The non-matching detection circuit 2 obtains the deviation of the output of the PDM 1 from the output of the Δ-Σ modulation type converter 7. Up to this step, the operations are the same as those shown in FIG. 1.

In FIG. 3, the hold (latch) circuit 3A detects the polarity when the output voltage command value does not match the output voltage detection value, and generates the voltage command value as digital data. Using the hold circuit 3A, the above described proportional control function or integral control function can be realized. The output of the non-matching detection circuit 2 is input to the mono-stable circuit 9 from which a signal corresponding to the non-matching time period is output. The outputs of the mono-stable circuit 9, hold circuit 3A, and PDM 1 are input to the data selection circuit 10. The data selection circuit 10 comprises two AND circuits. The output of the hold circuit 3A and the output of the mono-stable circuit 9 are input to one of the AND circuits. The output of the PDM 1 and the inverse output of the mono-stable circuit 9 are input to the other AND circuit. Therefore, the data selection circuit 10 selects the output from the hold circuit 3A during the hold period in which the mono-stable circuit 9 operates, and selects the output from the PDM 1 in other periods. The output of the data selection circuit 10 is provided to, for example, a pulse width modulation (PWM) circuit (not shown in FIG. 3) as a voltage command value (second voltage command value), and output as a gate signal for the switching element of the electric power converter including an inverter as in the case shown in FIG. 1.

Figure 4:
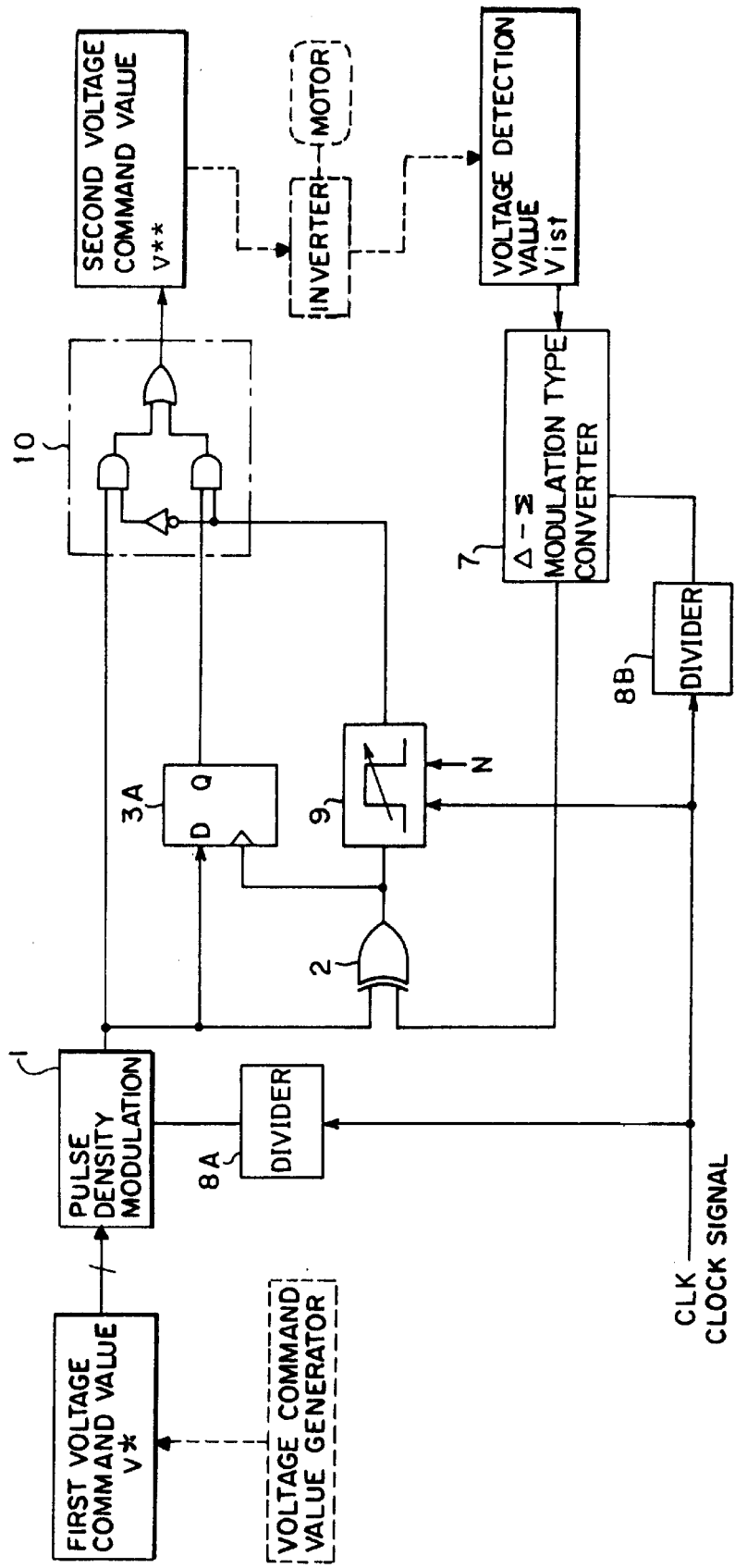
FIG. 4 shows the configuration of a variation of the second embodiment of the present invention.

FIG. 4 shows a variation of the second embodiment of the present invention.

In this variation, as in the example shown in FIG. 2, the dividers 8A and 8B for dividing the clock signal CLK are provided for the PDM 1 and the Δ-Σ modulation type converter 7 to avoid the necessity for quick-response circuits for the PDM 1 or Δ-Σ modulation type converter 7, thereby realizing a low-cost apparatus. Since the other units are the same as those shown in FIG. 3, further descriptions are omitted here. As described above by referring to FIG. 2, only one of the dividers 8A and 8B can be provided for either of the PDM 1 or the Δ-Σ modulation type converter 7.

According to the present invention, the output voltage command value and the output voltage detection value are converted into digital data, and the control apparatus can be designed as a digital hardware configuration. Therefore, the control apparatus can be realized as a simple and low-cost device.

What is claimed is:

1. An output voltage control apparatus for performing feedback control on a control object, comprising:

pulse density modulation type converter means for converting an output voltage command value for the control object into a pulse density;

Δ-Σ modulation type converter means for converting an output voltage detection value of the control object into a pulse density;

non-matching detection means for detecting a non-matching in output between said pulse density modulation type converter means and said Δ-Σ modulation type converter means;

polarity detection means for detecting a polarity of non-matching of outputs from said pulse density modulation type converter means and said Δ-Σ modulation type converter means;

first counter means for one of up counting and down counting clock signals depending on the output of said non-matching detection means and the polarity detected by said polarity detection means;

second counter means for one of up counting and down counting the clock signals depending on the outputs of said non-matching detection means and the polarity detected by said polarity detection means, and for setting a final counted value as an initial value of the next counting;

first and second operation means for multiplying outputs of said first and second counter means by predetermined coefficients, respectively; and adder means for adding outputs from said first and second operation means.

2. An output voltage control apparatus for performing feedback control on a control object, comprising:

pulse density modulation type converter means for converting an output voltage command value for the control object into a pulse density;

Δ-Σ modulation type converter means for converting an output voltage detection value of the control object into a pulse density;

non-matching detection means for detecting a non-matching in output between said pulse density modulation type converter means and said Δ-Σ modulation type converter means;

time signal generation means for outputting a predetermined time signal depending on an output of said non-matching detection means;

voltage command generation means for outputting a voltage command signal based on an output of said pulse density modulation type converter means and an output of said non-matching detection means; and selection means for selecting and outputting one of the output of said pulse density modulation type converter means and an output of said voltage command generation means based on an output of said time signal generation means.

3. An output voltage control apparatus for performing feedback control on an output voltage of an inverter which drives an AC machine, comprising:

first conversion means for converting a command value for an output voltage of the inverter into a pulse density;

second conversion means for converting a detection value of an output voltage of the inverter into a pulse density;

control means for detecting a deviation in outputs between said first and second conversion means, and generating a control voltage for use in controlling the inverter based on the detected deviation; and resolution altering means for altering a resolution of at least one of said first and second converting means.

4. An output voltage control apparatus for performing feedback control on an output voltage of an inverter which drives an AC machine, comprising:

first conversion means for converting a command value for an output voltage of the inverter into a pulse density;

second conversion means for converting a detection value of an output voltage of the inverter into a pulse density;

control means for detecting a deviation in outputs between said first and second conversion means, and generating a control voltage for use in controlling the inverter based on the detected deviation; and polarity detection means for detecting a polarity mismatch between the converted command value and detection value and outputting a polarity signal, wherein said control means provides the deviation as digital data based on the polarity signal, and generates the control voltage based on the obtained deviation.

5. An output voltage control apparatus for performing feedback control on an output voltage of an inverter which drives an AC machine, comprising:

first conversion means for converting a command value for an output voltage of the inverter into a pulse density;

second conversion means for converting a detection value of an output voltage of the inverter into a pulse density;

control means for detecting a deviation in outputs between said first and second conversion means, and generating a control voltage for use in controlling the inverter based on the detected deviation; and signal generation means for outputting a selection signal according to a time-length of non-matching between the converted command value and detection value, wherein said control means comprises:

command value generation means for generating a voltage command value for the inverter based on the non-matching state between the converted command value and detection value; and selection means for selecting one of an output from said first conversion means and an output from said command value generation means based on the selection signal, and for outputting the selected output as the control voltage.

6. A method of controlling an output voltage for performing feedback control on the output voltage of an inverter which drives an AC machine, comprising the steps of:

converting a command value for the output voltage of the inverter into a pulse density;

converting a detection value of the output voltage of the inverter into a pulse density;

detecting a deviation of the converted command value from the converted detection value; and generating a control voltage for use in controlling the inverter based on the detected deviation.

7. The method of controlling an output voltage according to claim 6, further comprising the step of:

altering resolution of a pulse density conversion of at least one of the command value and the detection value.

8. The method of controlling an output voltage according to claim 6, further comprising the steps of:

detecting a polarity of a difference between the converted command value and the converted detection value; and providing, as digital data, the deviation based on the detected polarity, and generating the control voltage based on the obtained deviation.

9. The method of controlling an output voltage according to claim 6, further comprising the steps of:

generating a selection signal according to a period of non-matching between the command value and the detection value;

generating a voltage command value for the inverter according to a non-matching state between the command value and the detection value; and selecting one of the command value converted into a pulse density and the voltage command value based on the selection signal, and outputting the selected value as the control voltage.

* * * * *